United States Patent
Chen et al.

(10) Patent No.: US 10,037,293 B2
(45) Date of Patent: Jul. 31, 2018

(54) WAFER-LEVEL PACKAGE HAVING ASYNCHRONOUS FIFO BUFFER USED TO DEAL WITH DATA TRANSFER BETWEEN DIFFERENT DIES AND ASSOCIATED METHOD

(71) Applicant: MEDIATEK INC., Hsin-Chu (TW)

(72) Inventors: Yi-Hung Chen, Yilan County (TW); Yuan-Chin Liu, Hsinchu (TW)

(73) Assignee: Nephos (Hefei) Co. Ltd., Hefei, Anhui (CN)

( * ) Notice: Subject to any disclaimer, the term of this patent is extended or adjusted under 35 U.S.C. 154(b) by 226 days.

(21) Appl. No.: 15/015,145

(22) Filed: Feb. 4, 2016

(65) Prior Publication Data
US 2016/0239444 A1 Aug. 18, 2016

Related U.S. Application Data

(60) Provisional application No. 62/117,091, filed on Feb. 17, 2015, provisional application No. 62/130,807, filed on Mar. 10, 2015.

(51) Int. Cl.
*G06F 13/38* (2006.01)
*G06F 13/362* (2006.01)
*G06F 13/40* (2006.01)
*H04L 7/00* (2006.01)

(52) U.S. Cl.
CPC ........ *G06F 13/362* (2013.01); *G06F 13/4022* (2013.01); *H04L 7/00* (2013.01)

(58) Field of Classification Search
None
See application file for complete search history.

(56) References Cited

U.S. PATENT DOCUMENTS

| | | | |
|---|---|---|---|
| 8,432,027 B2 | 4/2013 | Foster, Sr. | |
| 9,411,362 B2 * | 8/2016 | Feero | ........................ G06F 1/12 |
| 2008/0272368 A1 | 11/2008 | Do | |
| 2014/0312475 A1 | 10/2014 | Ali | |
| 2015/0206867 A1 | 7/2015 | Lim | |

OTHER PUBLICATIONS

Chen, Title of Invention: Wafer-Level Package Having Multiple Dies Arranged in Side-by-Side Fashion and Associated Yield Improvement Method, U.S. Appl. No. 15/015,110, filed Feb. 3, 2016.

* cited by examiner

*Primary Examiner* — Cheng-Yuan Tseng
(74) *Attorney, Agent, or Firm* — Winston Hsu

(57) ABSTRACT

A wafer-level package has a first die and a second die. The first die has a first clock source arranged to generate a first clock, a first sub-system arranged to generate transmit data, and an output circuit arranged to output the transmit data according to the first clock. The second die has a second sub-system, a second clock source arranged to generate a second clock, and an input circuit having an asynchronous first-in first-out (FIFO) buffer. The input circuit buffers the transmit data transferred from the output circuit in the asynchronous FIFO buffer according to the first clock, and outputs the buffered transmit data in the asynchronous FIFO buffer to the second sub-system according to the second clock.

19 Claims, 10 Drawing Sheets

WAFER-LEVEL PACKAGE HAVING ASYNCHRONOUS FIFO BUFFER USED TO DEAL WITH DATA TRANSFER BETWEEN DIFFERENT DIES AND ASSOCIATED METHOD

CROSS REFERENCE TO RELATED APPLICATIONS

This application claims the benefit of U.S. provisional application No. 62/117,091 (filed on Feb. 17, 2015) and U.S. provisional application No. 62/130,807 (filed on Mar. 10, 2015). The entire contents of the related applications are incorporated herein by reference.

BACKGROUND

The present invention relates to a chip design, and more particularly, to a wafer-level package having an asynchronous first-in first-out (FIFO) buffer used to deal with data transfer between different dies (e.g., identical dies) and an associated method.

When there are multiple dies assembled in the same package, an accumulated clock phase drift may occur between clocks in two dies. For example, the accumulated clock phase drift has an accumulated time interval error between clocks in two dies, and the accumulated time interval error may result from several factors including process variation, operating condition difference, power noise, etc. When the accumulated clock phase drift occurs, the timing of a clock in one die is not synchronous to the timing of a clock in another die. When setup/hold time violations are caused by the accumulated clock phase drift, the data transfer loss occurs between the two dies. Thus, there is a need for an innovative integrated circuit design which is capable of avoiding data transfer loss resulting from the accumulated clock phase drift of clocks in two dies assembled in the same package.

SUMMARY

One of the objectives of the claimed invention is to provide a wafer-level package having an asynchronous first-in first-out (FIFO) buffer used to deal with data transfer between different dies (e.g., identical dies) and an associated method.

According to a first aspect of the present invention, an exemplary wafer-level package is disclosed. The exemplary wafer-level package has a first die and a second die. The first die has a first clock source arranged to generate a first clock, a first sub-system arranged to generate transmit data, and an output circuit arranged to output the transmit data according to the first clock. The second die has a second sub-system, a second clock source arranged to generate a second clock, and an input circuit having an asynchronous first-in first-out (FIFO) buffer. The input circuit buffers the transmit data transferred from the output circuit in the asynchronous FIFO buffer according to the first clock, and outputs the buffered transmit data in the asynchronous FIFO buffer to the second sub-system according to the second clock.

According to a second aspect of the present invention, an exemplary method for managing data transfer between a first die and a second die in a wafer-level package is disclosed. The exemplary method includes: generating a first clock from a first clock source in the first die; generating transmit data from a first sub-system in the first die; outputting the transmit data via an output circuit of the first die according to the first clock; generating a second clock from a second clock source in the second die; buffering the transmit data transferred from the output circuit in an asynchronous first-in first-out (FIFO) buffer in an input circuit of the second die; and outputting the buffered transmit data in the asynchronous FIFO buffer to a second sub-system in the second die according to the second clock.

According to a third aspect of the present invention, an exemplary wafer-level package is disclosed. The exemplary wafer-level package includes a first die and a second die. The first die has a first clock source. The second die has a second clock source. The first die is identical to the second die. The first clock source is used to generate a clock shared by the first die and the second die, and the second clock source is not used to generate a clock used by any of the first die and the second die.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
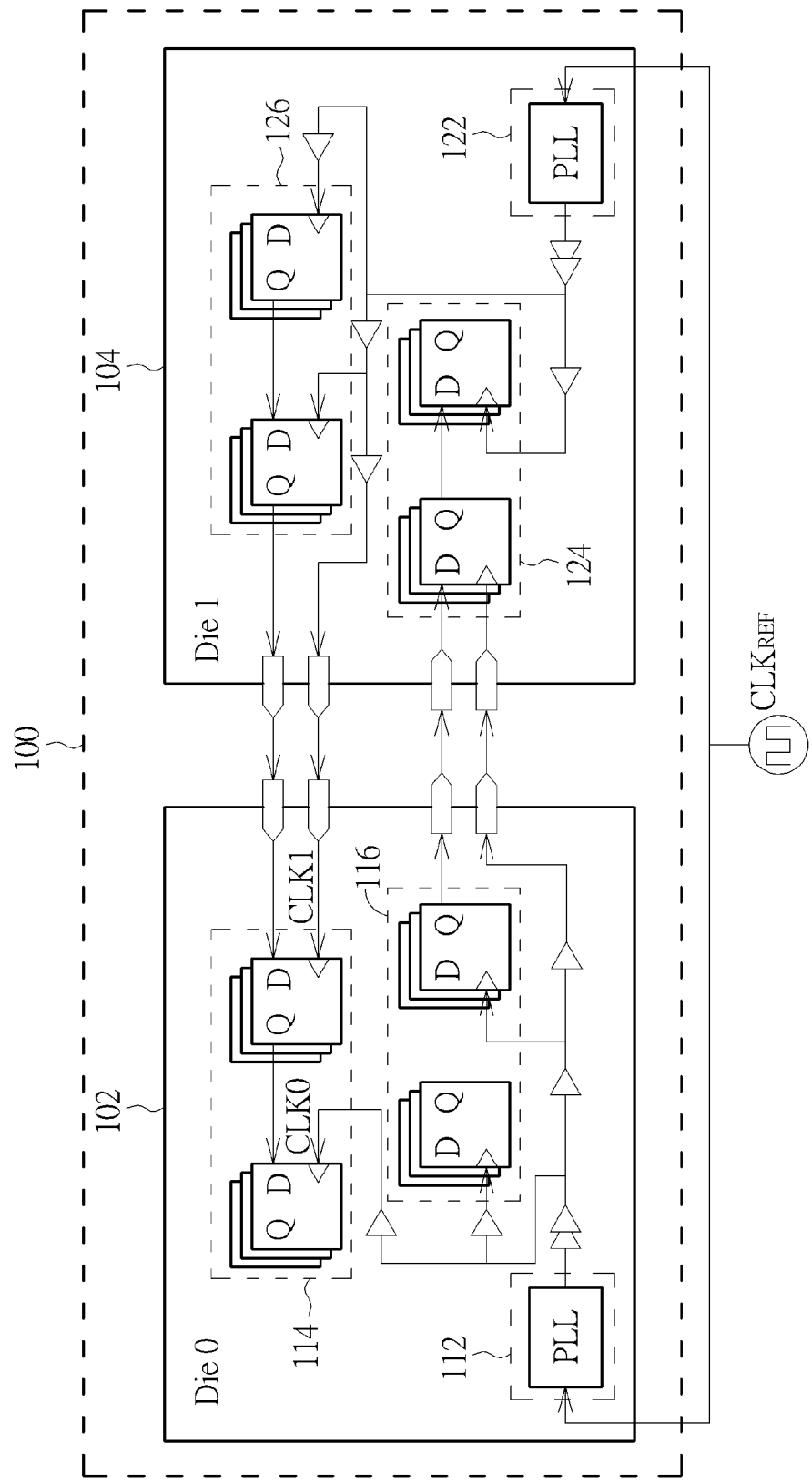
FIG. 1 is a diagram illustrating multiple dies assembled in the same package according to an embodiment of the present invention.

FIG. 1 is a diagram illustrating multiple dies assembled in the same package according to an embodiment of the present invention. A single package 100 has a first die (denoted by "Die 0") 102 and a second die (denoted by "Die 1") 104 assembled therein. The first die 102 has a clock source 112, an input circuit 114, and an output circuit 116. The second die 104 has a clock source 122, an input circuit 124, and an output circuit 126. The output circuit 116 is used to transfer transmit data to the second die 104, and the input circuit 124 is used to receive the transmit data from the first die 102. In addition, the output circuit 126 is used to transfer transmit data to the first die 102, and the input circuit 114 is used to receive the transmit data from the second die 104.

For example, each of the clock sources 112 and 122 can be implemented using a phase-locked loop (PLL). Hence, the clock source 112 generates a first clock CLK0 according to a reference clock $CLK_{REF}$, and the clock source 122 generates a second clock CLK1 according to the same reference clock $CLK_{REF}$. As shown in FIG. 1, the input circuit 114 of the first die 102 operates according to the first clock CLK0 and the second clock CLK1. Similarly, the input circuit 124 of the second die 104 also operates according to the first clock CLK0 and the second clock CLK1.

Figure 2:
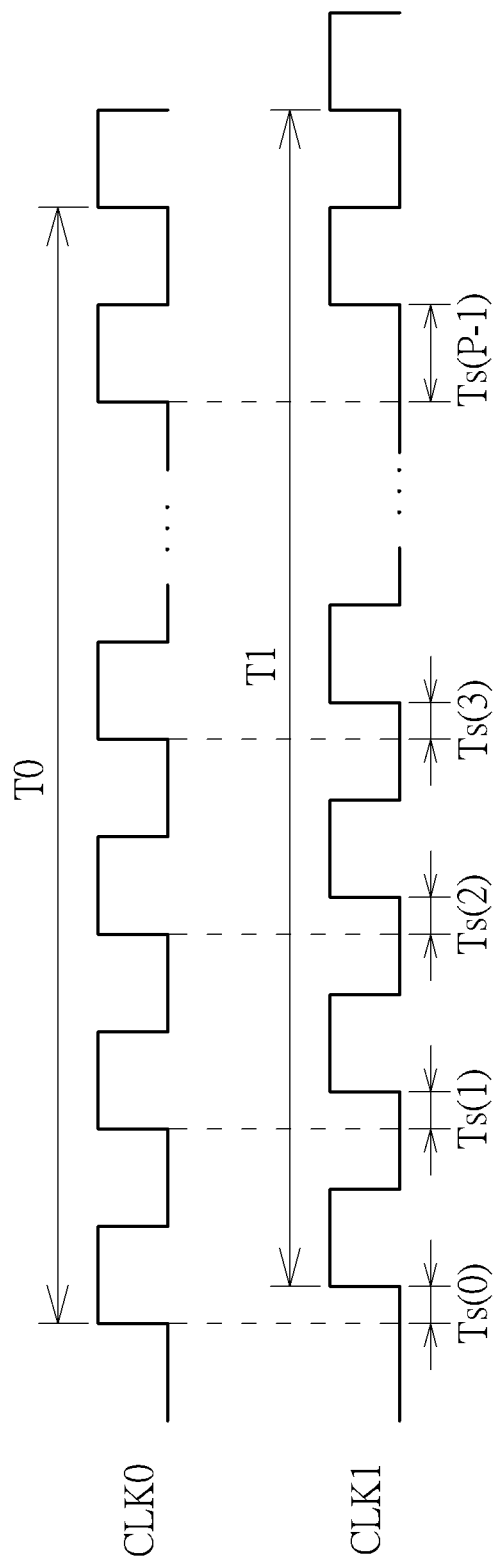
FIG. 2 is a timing diagram illustrating an accumulated time interval error between two clocks.

In a case where the clock sources 112 and 122 are identical, the first clock CLK0 and the second clock CLK1 are supposed to have the same frequency and the same phase. However, due to process variation, operation condition difference and/or power noise, there is an accumulated time interval error between the first clock CLK0 and the second clock CLK1, as illustrated in FIG. 2. For the same given number P of clock cycles, the first clock CLK0 has a time interval T0 and the second clock CLK1 has a different time interval T1. The accumulated time interval error |T0−T1| is a result of accumulating clock phase differences Ts (k) of successive P clock cycles, where k=0, 1, . . . , P−1. Since there is an accumulated clock phase drift between the first clock CLK0 and the second clock CLK1 using by the input circuits 114 and 124 respectively, the first die 102 and the second die 104 may suffer from data transfer loss.

Figure 3:
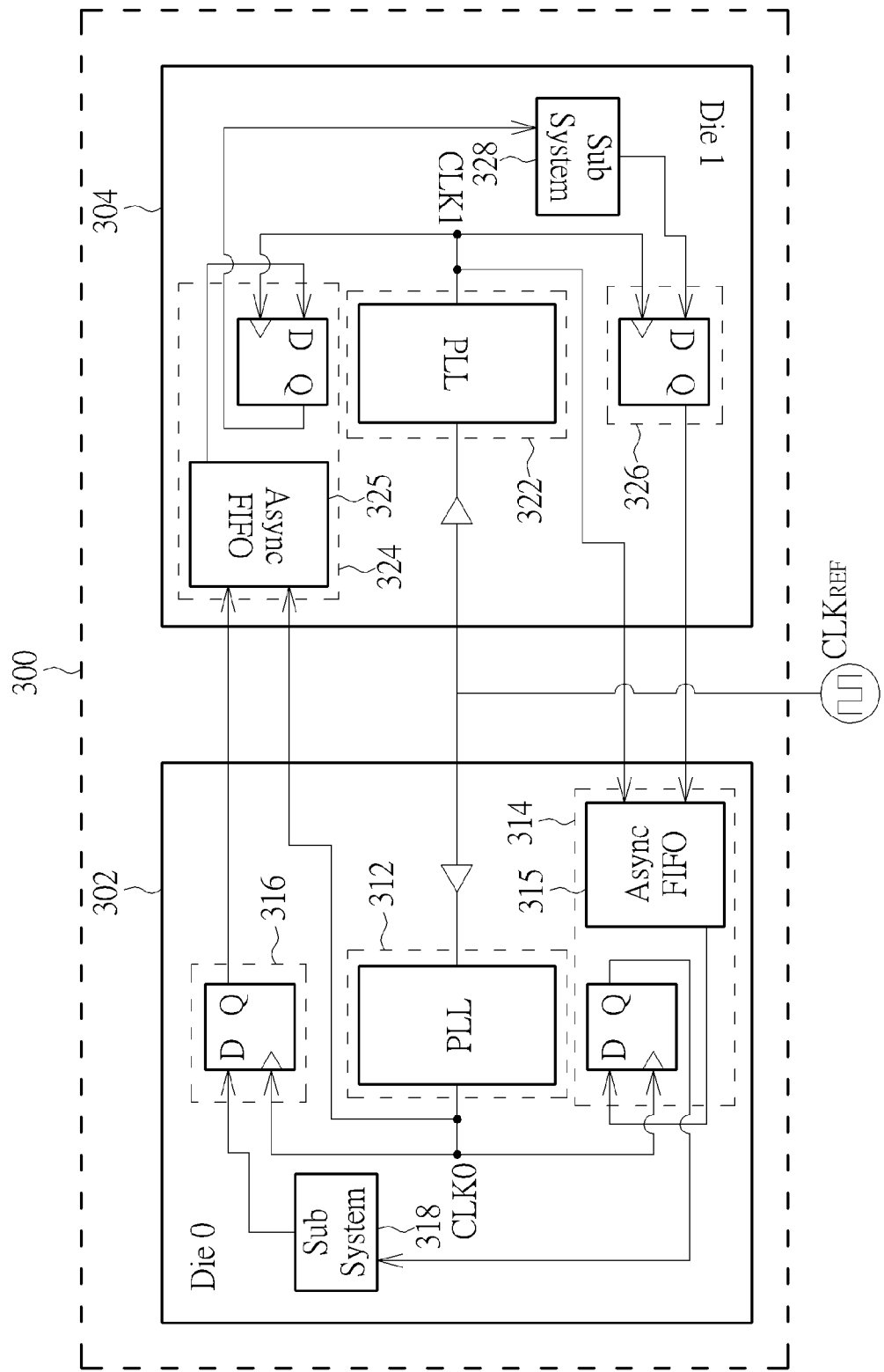
FIG. 3 is a diagram illustrating multiple dies assembled in the same package according to another embodiment of the present invention.

To solve the data transfer loss issue caused by the accumulated clock phase drift, the present invention proposes using an asynchronous first-in first-out (FIFO) buffer in an input circuit. FIG. 3 is a diagram illustrating multiple dies assembled in the same package according to another embodiment of the present invention. A single package 300 has multiple dies, including at least a first die (denoted by "Die 0") 302 and a second die (denoted by "Die 1") 304 assembled therein. In this embodiment, the package 300 is a wafer-level package such as an integrated fan-out (InFO) package or a chip on wafer on substrate (CoWoS) package, and the first die 302 is identical to the second die 304. For example, the first die 302 and the second die 304 are assembled in the wafer-level package to perform a network switch function. However, this is for illustrative purposes only, and is not meant to be a limitation of the present invention. Any wafer-level package with dies using the proposed technique to avoid data transfer loss falls within the scope of the present invention.

Wafer-level packaging is the technology of packaging semiconductor dies, which is different from a typical packaging method of slicing a wafer into individual semiconductor dies and then packaging the individual semiconductor dies. The wafer-level package mentioned above is therefore fabricated based on wafer-level process. That is, multiple semiconductor dies (e.g., homogeneous dies or heterogeneous dies) assembled in the same wafer-level package and connection paths/transmission buses/communication channels and so on routed between the semiconductor dies are fabricated with wafer-level process. Hence, connection paths, communication buses, or communication channels could be implemented by metal layer (such as RDL metal layer, Re-Distribution Layer, a metal layer on a die that makes the I/O pads of an integrated circuit available in other locations) rather than bonding wire of typical package.

The wafer-level package may be an integrated fan-out (InFO) package or a chip on wafer on substrate (CoWoS) package. Take InFO packages as examples for the following wafer-level packages, but not for a limitation. The wafer-level package used for the proposed ideas may be an InFO package or a CoWoS package, and "InFO package" and "CoWoS package" may be interchangeable.

The first die 302 has a clock source 312, an input circuit 314, an output circuit 316, and a sub-system 318. The second die 304 has a clock source 322, an input circuit 324, an output circuit 326, and a sub-system 328. The output circuit 316 is used to transfer transmit data (which is generated by the sub-system 318) to the second die 304, and the input circuit 324 is used to receive the transmit data (which is generated by the sub-system 318) from the first die 302. In addition, the output circuit 326 is used to transfer transmit data (which is generated by the sub-system 328) to the first die 302, and the input circuit 314 is used to receive the transmit data (which is generated by the sub-system 328) from the second die 304.

By way of example, but not limitation, each of the clock sources 312 and 322 can be implemented using a phase-locked loop (PLL). Hence, the clock source 312 generates a first clock CLK0 according to a reference clock $CLK_{REF}$ (e.g., 25 MHz clock), and the clock source 322 generates a second clock CLK1 according to the same reference clock $CLK_{REF}$. Though the first die 302 and the second die 304 are identical dies to thereby have the same circuit design, there may be accumulated clock phase drift between the first clock CLK0 and the second clock CLK1 due to certain factors including process variation, operation condition difference, power noise, etc. To avoid data transfer loss caused by the accumulated clock phase drift, the input circuit 314 of the first die 302 is configured to have an asynchronous FIFO buffer (denoted by "Async FIFO") 315 implemented therein. Since the first die 302 and the second 304 are identical dies, the input circuit 324 of the second die 304 also has an asynchronous FIFO buffer 325 (denoted by "Async FIFO") implemented therein.

As shown in FIG. 3, the input circuit 314 of the first die 302 operates according to the first clock CLK0 and the second clock CLK1. Similarly, the input circuit 324 of the second die 304 also operates according to the first clock CLK0 and the second clock CLK1. With regard to the input circuit 314, it buffers the transmit data (which is transferred from the output circuit 326) in the asynchronous FIFO buffer 315 according to the second clock CLK1 generated at the second die 304, and outputs the buffered transmit data in the asynchronous FIFO buffer 315 to the sub-system 318 according to the first clock CLK0 generated at the first die 302. With regard to the input circuit 324, it buffers the transmit data (which is transferred from the output circuit 316) in the asynchronous FIFO buffer 325 according to the first clock CLK0 generated at the first die 302, and outputs the buffered transmit data in the asynchronous FIFO buffer 325 to the sub-system 328 according to the second clock CLK1 generated at the second die 304.

In this embodiment, the FIFO depth of the asynchronous FIFO buffer 315/325 depends on the maximum accumulated time interval error (e.g., |T0−T1| shown in FIG. 2). For example, if the clock phase drift is large, the asynchronous FIFO buffers 315/325 are configured to have a large FIFO depth. For another example, if the clock phase drift is small, the asynchronous FIFO buffers 315/325 are configured to have a small FIFO depth. With a proper selection of the FIFO depth of the asynchronous FIFO buffer 315, the accumulated time interval error can be concealed by the asynchronous FIFO buffer 315, such that the input circuit 314 can have a stable output to the sub-system 318 according to data sampling performed based on a local source clock (i.e., first clock CLK0). Similarly, with a proper selection of the FIFO depth of the asynchronous FIFO buffer 325, the accumulated time interval error can be concealed by the asynchronous FIFO buffer 325, such that the input circuit 324 can have a stable output to the sub-system 328 according to data sampling performed based on a local source clock (i.e., second clock CLK1).

As mentioned above, the FIFO depth of the asynchronous FIFO buffer 315/325 depends on the maximum accumulated time interval error. In a worst case, the FIFO depth of the asynchronous FIFO buffer 315/325 may be large, thus leading to higher production cost. The present invention further proposes using a flow control scheme to manage an input data flow of the asynchronous FIFO buffer 315/325, thereby relaxing the buffer size requirement of the asynchronous FIFO buffer 315/325. Further details of the flow control scheme are described as below.

Figure 4:
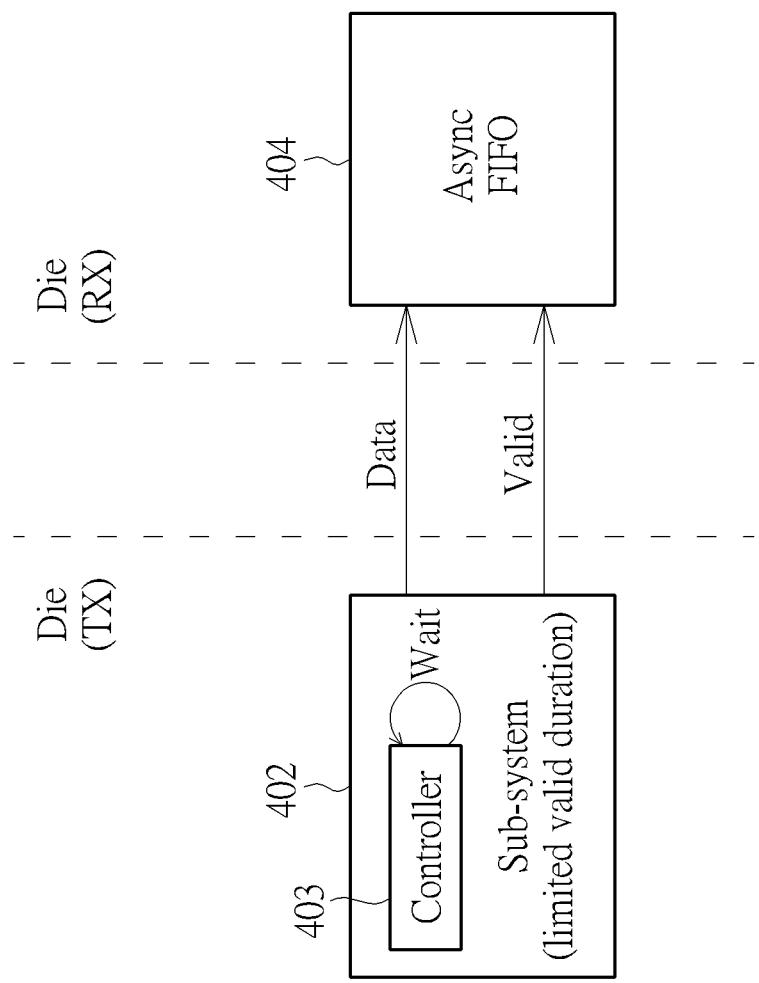
FIG. 4 is a diagram illustrating an active flow control scheme according to an embodiment of the present invention.

FIG. 4 is a diagram illustrating an active flow control scheme according to an embodiment of the present invention. A sub-system 402 is a data source in a die located at a transmit (TX) side, and an asynchronous FIFO buffer 404 is in a different die located at a receive (RX) side. For example, the sub-system 402 is the sub-system 318 shown in FIG. 3, and the asynchronous FIFO buffer 404 is the asynchronous FIFO buffer 325 shown in FIG. 3. For another example, the sub-system 402 is the sub-system 328 shown in FIG. 3, and the asynchronous FIFO buffer 404 is the asynchronous FIFO buffer 315 shown in FIG. 3. The data transfer between the sub-system 402 and the asynchronous FIFO buffer 404 is controlled by an interface valid signal Valid. For example, the interface valid signal Valid with a 1T active period allows one data transfer between the sub-system 402 and the asynchronous FIFO buffer 404, where T is a period of the source clock used by the sub-system 402.

As shown in FIG. 4, the sub-system 402 has a controller 403 arranged to actively enable a wait state of the sub-system 402, regardless of a use status of the asynchronous FIFO buffer 404. When the sub-system 402 enters the wait state, the interface valid signal Valid is deasserted (inactive) and the data transfer between the sub-system 402 and the asynchronous FIFO buffer 404 is stopped. In one exemplary design, the flow control scheme employed by the sub-system 402 ensures that a maximum continuous active interface valid duration does not exceed a predetermined threshold (e.g., 2000T). For example, the controller 403 adds a 1T wait state within every 2000T period, thus ensuring that each continuous active duration of the interface valid signal Valid does not exceed a 2000T period.

Figure 5:
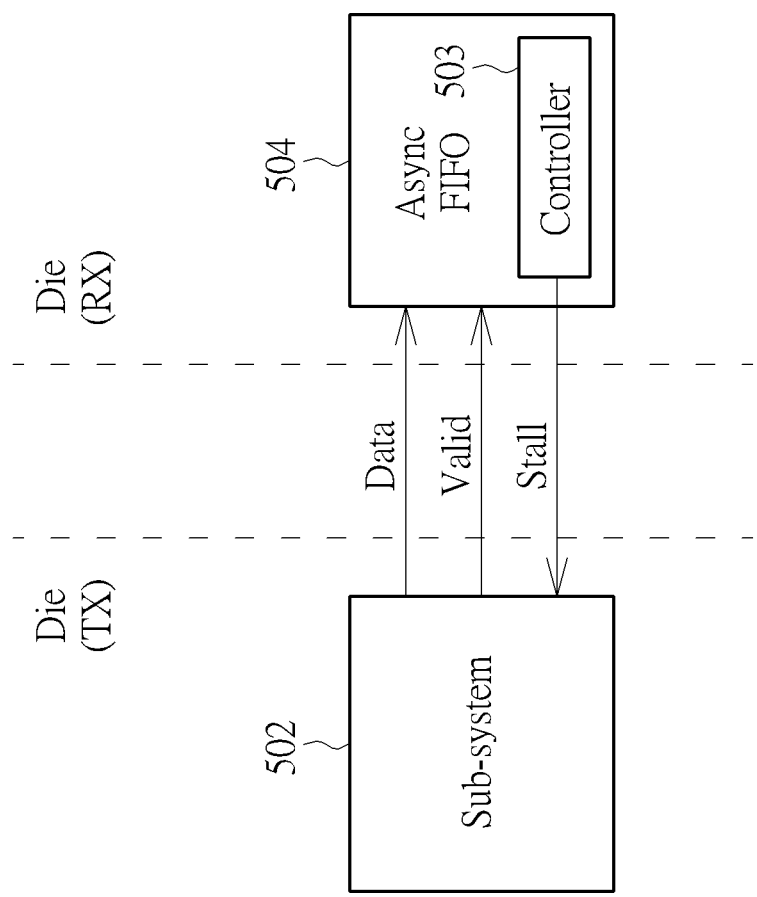
FIG. 5 is a diagram illustrating a passive flow control scheme according to an embodiment of the present invention.

FIG. 5 is a diagram illustrating a passive flow control scheme according to an embodiment of the present invention. A sub-system 502 is a data source embedded in a die located at a transmit (TX) side, and an asynchronous FIFO buffer 504 is in a different die located at a receive (RX) side. For example, the sub-system 502 is the sub-system 318 shown in FIG. 3, and the asynchronous FIFO buffer 504 is the asynchronous FIFO buffer 325 shown in FIG. 3. For another example, the sub-system 502 is the sub-system 328 shown in FIG. 3, and the asynchronous FIFO buffer 504 is the asynchronous FIFO buffer 315 shown in FIG. 3. The data transfer between the sub-system 502 and the asynchronous FIFO buffer 504 is controlled by an interface valid signal Valid. For example, the interface valid signal Valid with a 1T active period allows one data transfer between the sub-system 502 and the asynchronous FIFO buffer 504.

As shown in FIG. 5, the asynchronous FIFO buffer 504 has a controller 503 arranged to generate a stall event to the sub-system 502 in response to a use status of the asynchronous FIFO buffer 504. Hence, the sub-system 502 passively deasserts the interface valid signal Valid upon receiving the stall event generated from the asynchronous FIFO buffer 504. In this embodiment, the flow control scheme employed by the asynchronous FIFO buffer 504 generates one stall event when detecting that a size of a used storage space in the asynchronous FIFO buffer 504 reaches a predetermined threshold. For example, when the asynchronous FIFO buffer 504 is almost full, the controller 503 generates one stall event to the sub-system 502 for instructing the sub-system 502 to deassert the interface valid signal Valid for a 1T period, where T is a period of the source clock used by the sub-system 502. Specifically, when the interface valid signal Valid is deasserted (inactive) for a specific period (e.g., 1T period), the data transfer between the sub-system 502 and the asynchronous FIFO buffer 504 is stopped during the specific period (e.g., 1T period).

Figure 6:
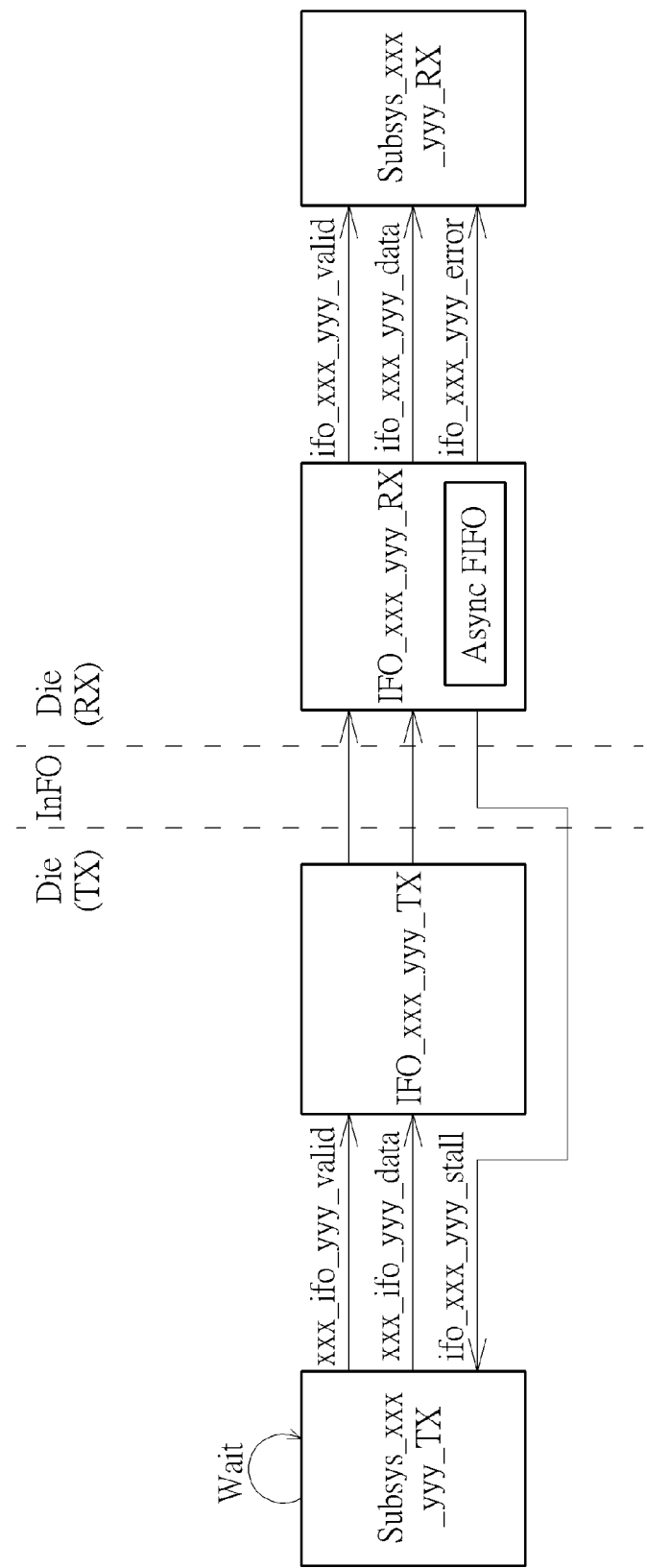
FIG. 6 is a diagram illustrating signals involved in data transfer between two dies assembled in the same package according to an embodiment of the present invention.

FIG. 6 is a diagram illustrating signals involved in data transfer between two dies assembled in the same package according to an embodiment of the present invention. In this example, it is assumed that the wafer-level package is an InFO package having two dies assembled therein, a TX-side subsystem subsys_xxx_yyy_TX is required to transfer transmit data to an RX-side subsystem subsys_xxx_yyy_RX via a TX-side output circuit IFO_xxx_yyy_TX and an RX-side input circuit IFO_xxx_yyy_RX, and the RX-side input circuit IFO_xxx_yyy_RX has an asynchronous FIFO buffer (denoted by Async FIFO) implemented therein.

The signal xxx_ifo_yyy_valid is an interface valid signal for enabling/disabling the data transmission between TX-side output circuit IFO_xxx_yyy_TX and RX-side input circuit IFO_xxx_yyy_RX (particularly, the asynchronous FIFO buffer). For example, the signal xxx_ifo_yyy_valid is asserted for a 1T period for one data transfer. The signal xxx_ifo_yyy_data is an interface data signal for carrying the transmit data generated from the TX-side subsystem subsys_xxx_yyy_TX, where the signal xxx_ifo_yyy_data has valid data transfer with active xxx_ifo_yyy_valid. The signal ifo_xxx_yyy_stall is an interface stall signal for carrying a stall event triggered by the passive flow control scheme employed by the RX-side input circuit IFO_xxx_yyy_RX. For example, the signal ifo_xxx_yyy_stall has a low-to-high transition for instructing the TX-side subsystem subsys_xxx_yyy_TX to deassert the signal xxx_ifo_yyy_valid within a specific period (e.g., a 1000T period).

Figure 7:
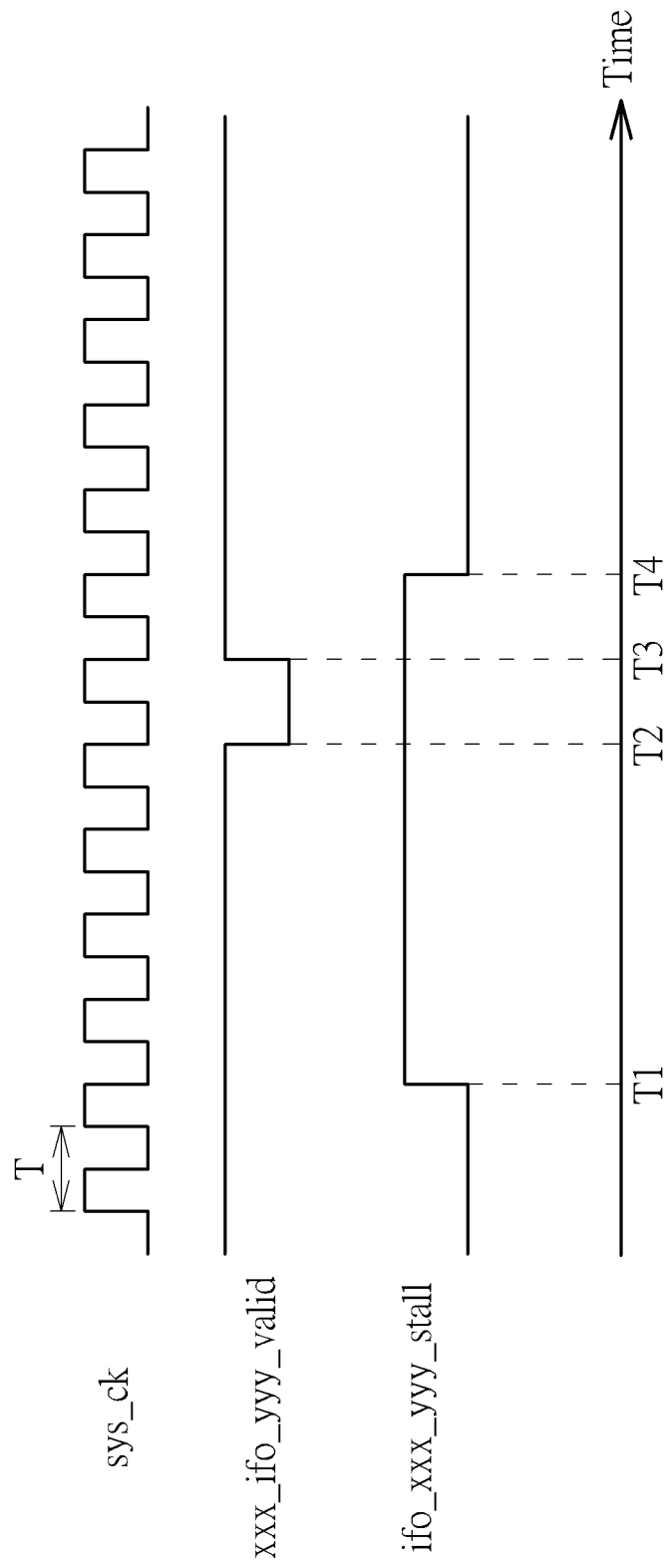
FIG. 7 is a timing diagram illustrating an operation of a passive flow control scheme employed by an RX-side input circuit shown in FIG. 6.

FIG. 7 is a timing diagram illustrating an operation of a passive flow control scheme employed by the RX-side input circuit IFO_xxx_yyy_RX shown in FIG. 6. The clock sys_ck with a period T is generated by a clock source. The RX-side input circuit IFO_xxx_yyy_RX asserts the signal ifo_xxx_yyy_stall at the time point T1. After receiving the low-to-high transition of the signal ifo_xxx_yyy_stall at the time point T1, the TX-side subsystem subsys_xxx_yyy_TX deasserts the signal xxx_ifo_yyy_valid at the time point T2 and then asserts the signal xxx_ifo_yyy_valid at the time point T3, where T3−T2=1T. It should be noted that an interval between T1 and T2 is constrained to be within a specific period (e.g., a 1000T period). In addition, the TX-side subsystem subsys_xxx_yyy_TX deasserts the signal ifo_xxx_yyy_stall at the time point T4 to indicate completion of one flow control command. It should be noted that the signal ifo_xxx_yyy_stall is ignored by the TX-side subsystem subsys_xxx_yyy_TX when the active flow control scheme is employed by the TX-side subsystem subsys_xxx_yyy_TX. The signal ifo_xxx_yyy_valid is an interface valid signal for enabling/disabling the data transmission between RX-side input circuit IFO_xxx_yyy_RX (particularly, the asynchronous FIFO buffer) and the RX-side subsystem subsys_xxx_yyy_RX. For example, the signal ifo_xxx_yyy_valid is asserted for a 1T period for one data transfer. The signal ifo_xxx_yyy_data is an interface data signal for carrying the transmit data read from RX-side input circuit IFO_xxx_yyy_RX (particularly, the asynchronous FIFO buffer), where the signal ifo_xxx_yyy_data has valid data transfer with active ifo_xxx_yyy_valid. The signal ifo_xxx_yyy_error is an interface error signal for indicating a data transfer error. For example, the signal ifo_xxx_yyy_error is asserted for a 1T period for one data transfer with error. When the flow control scheme fails to work normally due to certain factors, the TX-side subsystem subsys_xxx_yyy_TX may keep generating and outputting transmit data under the condition that the asynchronous FIFO buffer of the RX-side input circuit IFO_xxx_yyy_RX is full. The RX-side input circuit IFO_xxx_yyy_RX asserts the signal ifo_xxx_yyy_error to indicate occurrence of data transfer error.

Figure 8:
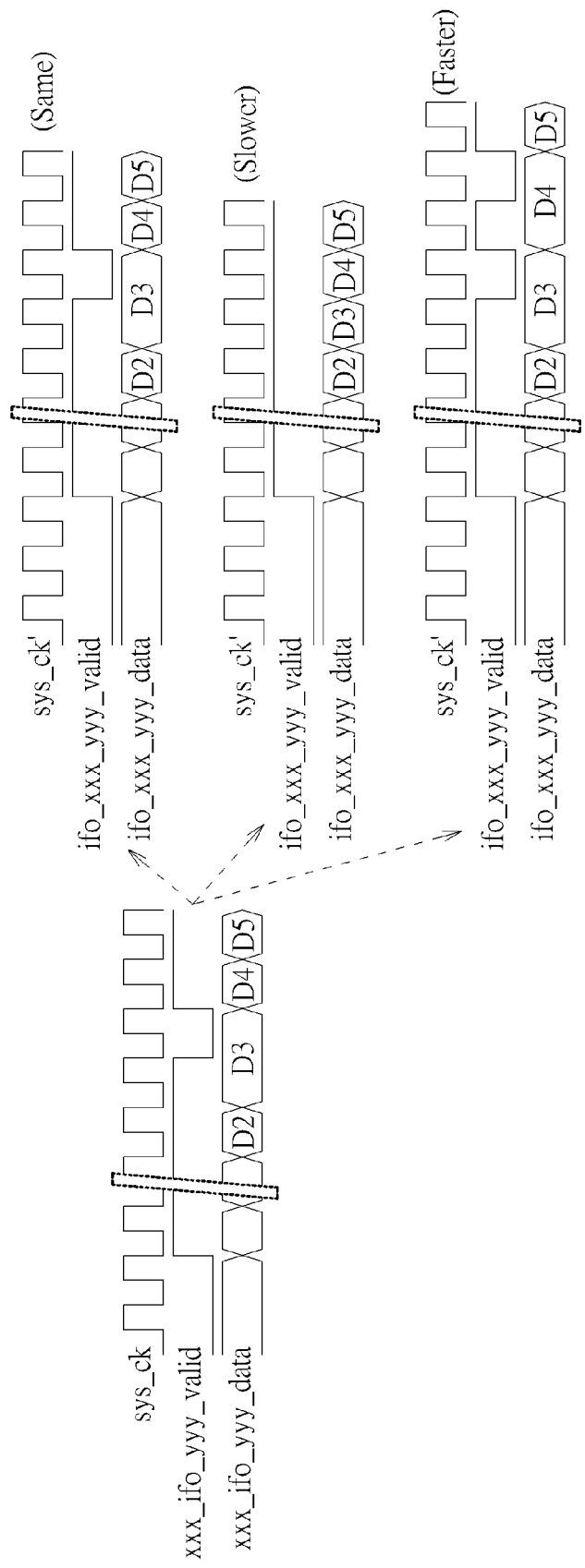
FIG. 8 is a timing diagram illustrating different data transfer scenarios according to an embodiment of the present invention.

An asynchronous FIFO buffer is implemented to solve the data transfer loss issue caused by accumulated clock phase drift. It should be noted that the number of active interface valid periods of the signal xxx_ifo_yyy_valid at the TX side is guaranteed to be the same as the number of active interface valid periods of the signal ifo_xxx_yyy_valid at the RX side. In addition, the RX-side input circuit IFO_xxx_yyy_RX may insert or delete inactive interface valid period(s) for timing synchronization. FIG. 8 is a timing diagram illustrating different data transfer scenarios according to an embodiment of the present invention. In a first case where a clock sys_ck generated by a clock source at the TX side is the same as a clock sys_ck' generated by a clock source at the RX side, the signal ifo_xxx_yyy_valid generated by the RX-side input circuit IFO_xxx_yyy_RX is the same as the signal xxx_ifo_yyy_valid generated by the TX-side subsystem subsys_xxx_yyy_TX.

In a second case where a clock sys_ck generated by a clock source at the TX side is faster than a clock sys_ck' generated by a clock source at the RX side, the signal ifo_xxx_yyy_valid generated by the RX-side input circuit IFO_xxx_yyy_RX is different from the signal xxx_ifo_yyy_valid generated by the TX-side subsystem subsys_xxx_yyy_TX, where an inactive interface valid period of the signal xxx_ifo_yyy_valid is absent in the signal ifo_xxx_yyy_valid due to a slower clock at the RX side. In a third case where a clock sys_ck generated by a clock source at the TX side is slower than a clock sys_ck' generated by a clock source at the RX side, the signal ifo_xxx_yyy_valid generated by the RX-side input circuit IFO_xxx_yyy_RX is different from the signal xxx_ifo_yyy_valid generated by the TX-side subsystem subsys_xxx_yyy_TX, where an additional inactive interface valid period is inserted into the signal ifo_xxx_yyy_valid due to a faster clock at the RX side.

Figure 9:
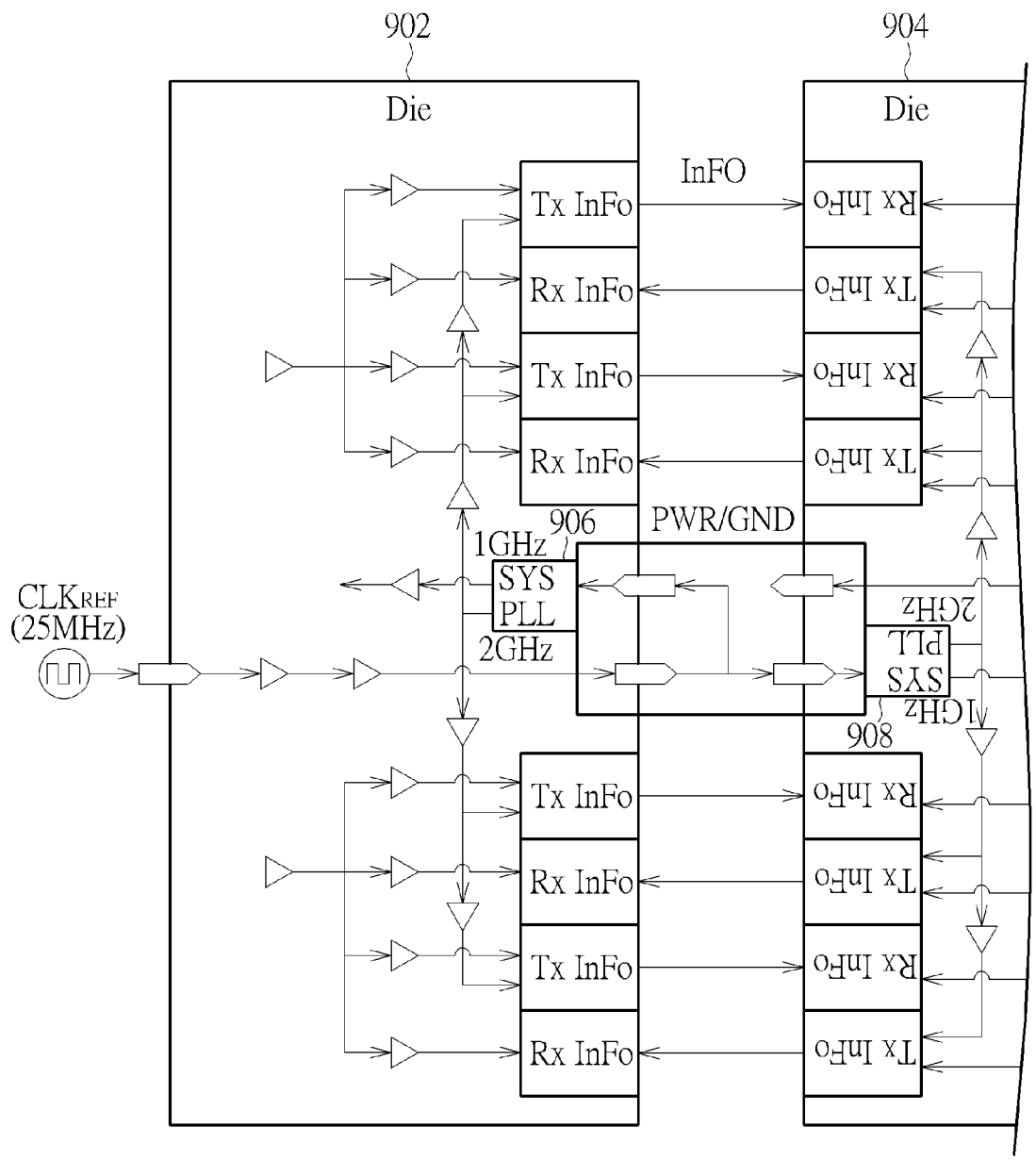
FIG. 9 is a diagram illustrating a first clock scheme employed by a wafer-level package according to an embodiment of the present invention.

FIG. 9 is a diagram illustrating a first clock scheme employed by a wafer-level package (e.g., an InFO package) according to an embodiment of the present invention. As shown in FIG. 9, a reference clock $CLK_{REF}$ (e.g., 25 MHz clock) is received by only one of the identical dies 902 and 904 and then supplied to respective clock sources (e.g., PLLs) 906 and 908 of the identical dies 902 and 904. Since a source clock (e.g., 2 GHz clock) needed by die 902 is generated by one clock source 906 implemented in die 902, and a source clock (e.g., 2 GHz clock) needed by die 904 is generated by a different clock source 908 implemented in die 904, asynchronous FIFO buffers and/or associated flow control schemes may be used to avoid the data transfer loss issue caused by accumulated clock phase drift between clocks of dies 902 and 904.

Figure 10:
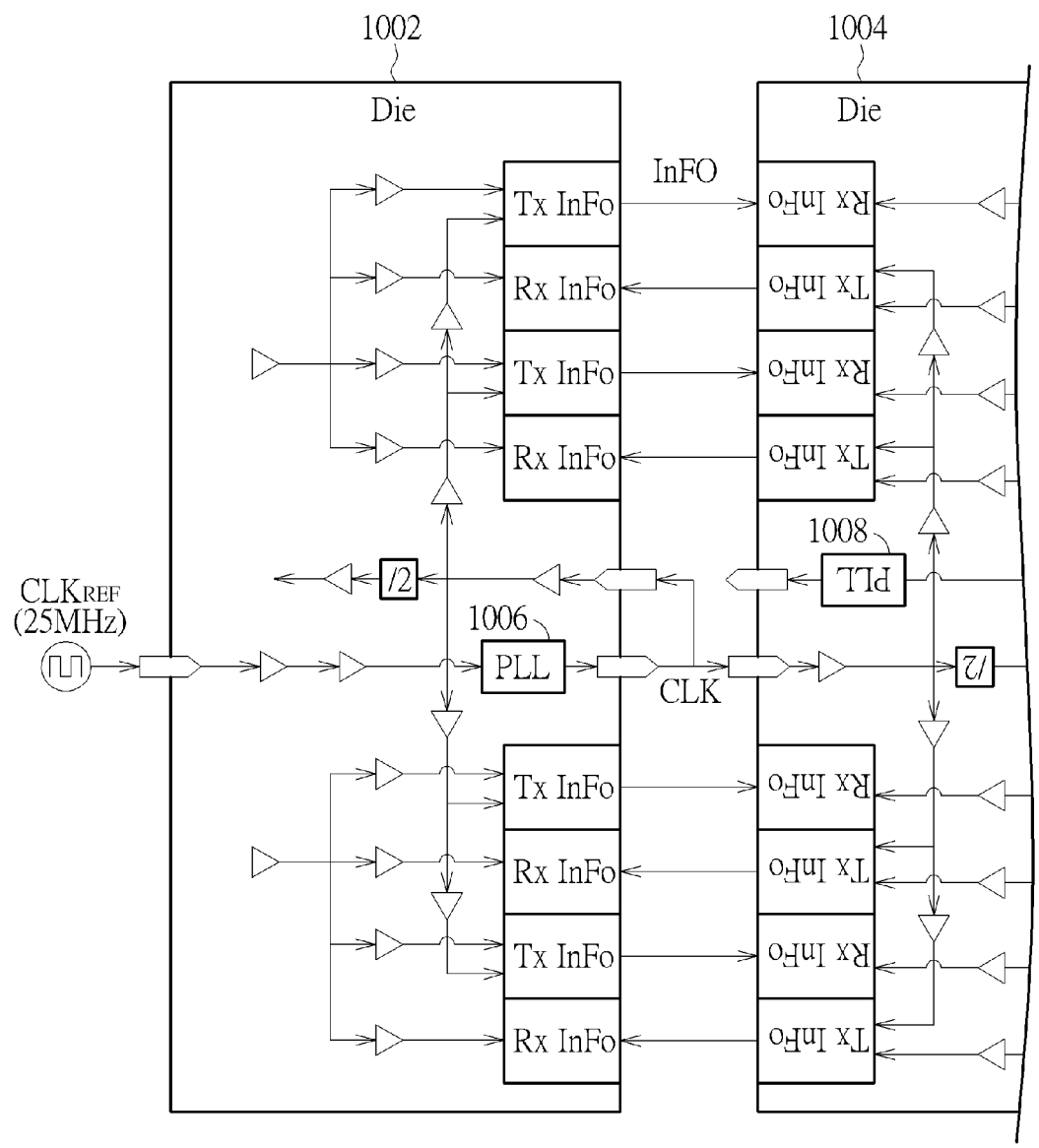
FIG. 10 is a diagram illustrating a second clock scheme employed by a wafer-level package according to an embodiment of the present invention.

However, if source clocks needed by dies 902 and 904 are generated by the same clock source, the accumulated clock phase drift can be avoided or mitigated. Hence, asynchronous FIFO buffers and/or associated flow control schemes may be omitted to reduce the production cost. FIG. 10 is a diagram illustrating a second clock scheme employed by a wafer-level package (e.g., an InFO package) according to an embodiment of the present invention. As shown in FIG. 10, a reference clock $CLK_{REF}$ is received by only one of the identical dies 1002 and 1004 and then supplied to only one of the clock sources (e.g., PLLs) 1006 and 1008 of the identical dies 1002 and 1004. The clock source 1006 is used to generate a clock CLK shared by identical dies 1002 and 1004. For example, the reference clock $CLK_{REF}$ has a clock rate equal to 25 MHz, and the clock CLK has a clock rate equal to 1 GHz or 800 MHz that can be transmitted over an interface between identical dies 1002 and 1004 assembled in the same wafer-level package. With regard to the clock source 1008 of die 1004, it is not used to generate a clock used by any of the identical dies 1002 and 1004. For example, the clock source 1008 may be treated as a dummy component for die 1004.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wafer-level package comprising:
   a first die, comprising:
      a first clock source, arranged to generate a first clock; and
      a first sub-system, arranged to generate transmit data; and
      an output circuit, arranged to output the transmit data according to the first clock; and
   a second die, comprising:
      a second sub-system;
      a second clock source, arranged to generate a second clock; and
      an input circuit, comprising an asynchronous first-in first-out (FIFO) buffer, wherein the input circuit is arranged to refer to the first clock to buffer the transmit data transferred from the output circuit in the asynchronous FIFO buffer, and refer to the second clock to output the buffered transmit data in the asynchronous FIFO buffer to the second sub-system;
   wherein the first die and the second die are wafer-level packaged.

2. The wafer-level package of claim 1, wherein the first die is identical to the second die.

3. The wafer-level package of claim 1, wherein the first die and the second die are assembled in the wafer-level package to perform a network switch function.

4. The wafer-level package of claim 1, wherein the wafer-level package is an integrated fan-out (InFO) package or a chip on wafer on substrate (CoWoS) package.

5. The wafer-level package of claim 1, wherein the first sub-system is further arranged to employ a flow control scheme to manage an input data flow of the asynchronous FIFO buffer.

6. The wafer-level package of claim 5, wherein the flow control scheme enables a wait state of the first sub-system, regardless of a use status of the asynchronous FIFO buffer.

7. The wafer-level package of claim 6, wherein the flow control scheme ensures that a maximum continuous active interface valid duration does not exceed a predetermined threshold.

8. The wafer-level package of claim 1, wherein the input circuit is further arranged to employ a flow control scheme to manage an input data flow of the asynchronous FIFO buffer.

9. The wafer-level package of claim 8, wherein the flow control scheme generates a stall event to the first sub-system in response to a use status of the asynchronous FIFO buffer.

10. The wafer-level package of claim 9, wherein the flow control scheme generates the stall event when detecting that a size of a used storage space in the asynchronous FIFO buffer reaches a predetermined threshold.

11. A method for managing data transfer between a first die and a second die in a wafer-level package, comprising:
   generating a first clock from a first clock source;
   generating transmit data from a first sub-system in the first die;
   outputting the transmit data via an output circuit of the first die according to the first clock;
   generating a second clock from a second clock source;
   referring to the first clock for buffering the transmit data transferred from the output circuit in an asynchronous first-in first-out (FIFO) buffer in an input circuit of the second die; and
   referring to the second clock for outputting the buffered transmit data in the asynchronous FIFO buffer to a second sub-system in the second die;
   wherein the first die and the second die are wafer-level packaged.

12. The method of claim 11, wherein the first die is identical to the second die.

13. The method of claim 11, wherein the first die and the second die are assembled in the wafer-level package to perform a network switch function.

14. The method of claim 11, wherein the wafer-level package is an integrated fan-out (InFO) package or a chip on wafer on substrate (CoWoS) package.

15. The method of claim 11, further comprising:
   managing an input data flow of the asynchronous FIFO buffer according to a flow control scheme employed by the first sub-system.

16. The method of claim 15, wherein the flow control scheme enables a wait state of the first sub-system, regardless of a use status of the asynchronous FIFO buffer.

17. The method of claim 16, wherein the flow control scheme ensures that a maximum continuous active interface valid duration does not exceed a predetermined threshold.

18. The method of claim 11, further comprising:
   managing an input data flow of the asynchronous FIFO buffer according to a flow control scheme employed by the input circuit.

19. The method of claim 18, wherein the flow control scheme generates a stall event to the first sub-system in response to a use status of the asynchronous FIFO buffer.

* * * * *